United States Patent [19]
Dennis

[11] Patent Number: 5,915,899
[45] Date of Patent: Jun. 29, 1999

[54] END RESTRAINT FOR SECURING PLURAL ELONGATED ITEMS

[76] Inventor: John G. Dennis, 8460 Walker St., La Palma, Calif. 90623

[21] Appl. No.: 08/760,266

[22] Filed: Dec. 5, 1996

[51] Int. Cl.⁶ ....................................................... B60P 7/12
[52] U.S. Cl. ................................ 410/36; 410/34; 410/42; 410/97; 410/117; 138/96 R
[58] Field of Search ................................. 410/32, 34, 36, 410/42, 96, 97, 117, 118; 24/712, 713.3, 713.4; 224/405, 534, 318, 324, 328; 138/96 R; 206/443, 592

[56] References Cited

U.S. PATENT DOCUMENTS

| | | | |
|---|---|---|---|
| 1,934,681 | 11/1933 | Damsel | 138/96 R |
| 2,028,576 | 1/1936 | Van Dyke | 138/96 R |
| 2,034,423 | 3/1936 | Shrum | 138/96 T |
| 2,213,430 | 9/1940 | Irwin et al. | 138/96 T |
| 2,371,913 | 3/1945 | Phillips et al. | 138/96 R |
| 2,417,336 | 3/1947 | Whitehead | 24/712 X |
| 2,942,625 | 6/1960 | Costanzo | 138/96 R |
| 3,587,654 | 6/1971 | Yocum | 138/36 |
| 3,713,463 | 1/1973 | Bywater, Jr. | 138/89 |
| 3,897,919 | 8/1975 | Weingarten | 410/97 |
| 4,720,135 | 1/1988 | Farina | 296/136 |
| 5,203,655 | 4/1993 | Persau | 410/3 |
| 5,516,244 | 5/1996 | Baka | 410/36 |
| 5,603,591 | 2/1997 | McLellan | 410/97 |

FOREIGN PATENT DOCUMENTS

| | | | |
|---|---|---|---|
| 94/04052 | 3/1994 | WIPO | 24/712 |

*Primary Examiner*—Stephen T. Gordon
*Attorney, Agent, or Firm*—Roy A. Ekstrand

[57] ABSTRACT

A flexible fabric envelope defines a generally conical shape and is formed to provide a plurality of outer rib portions each receiving an eyelet having a passage therethrough. The flexible fabric envelope is formed of a high visibility fabric material having substantial strength and flexibility. A drawstring is passed through the eyelets to enable the envelope to be placed upon the common ends of a bundle of elongated items transported upon a truck rack or the like. The drawstring is tightened to conform the envelope to the outer surface of the bundle and secure the envelope to the bundle of elongated items. The drawstring is tied to complete attachment and is further secured to the truck rack.

11 Claims, 2 Drawing Sheets

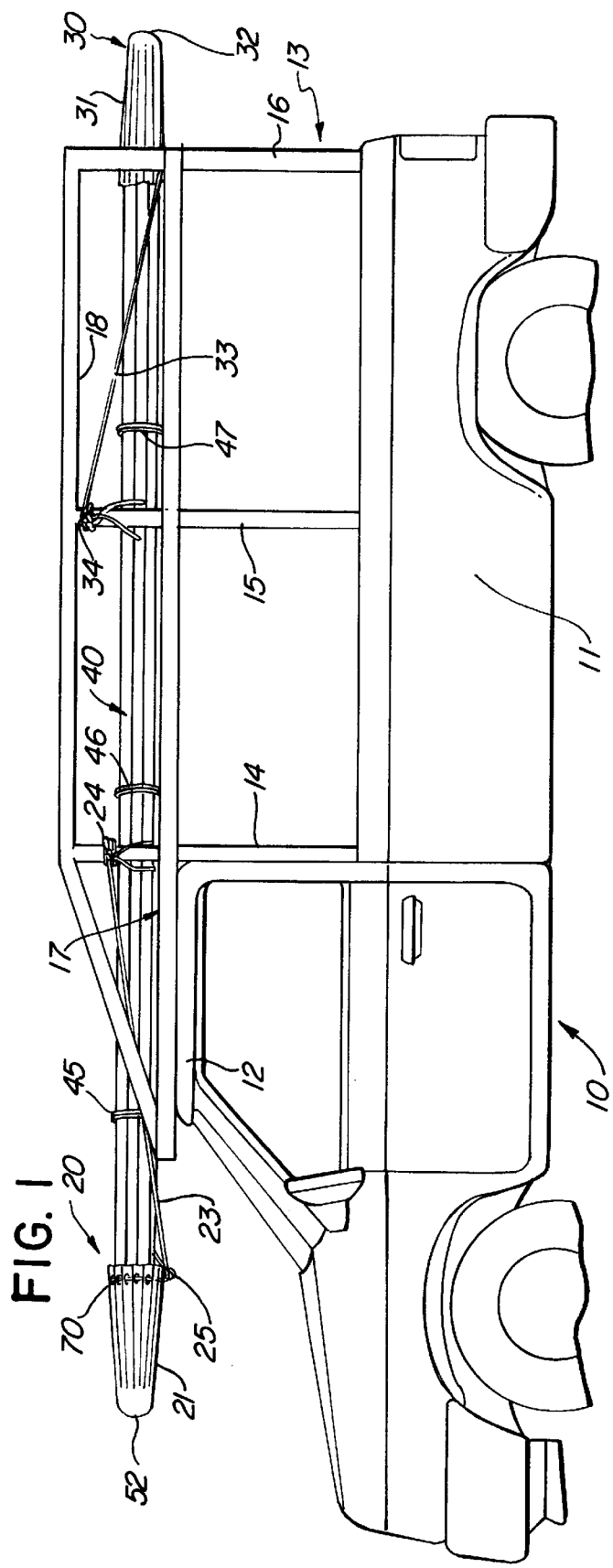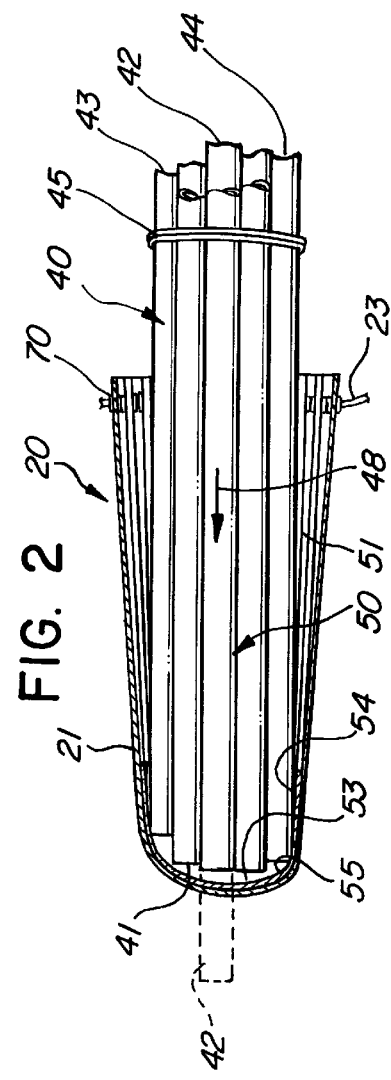

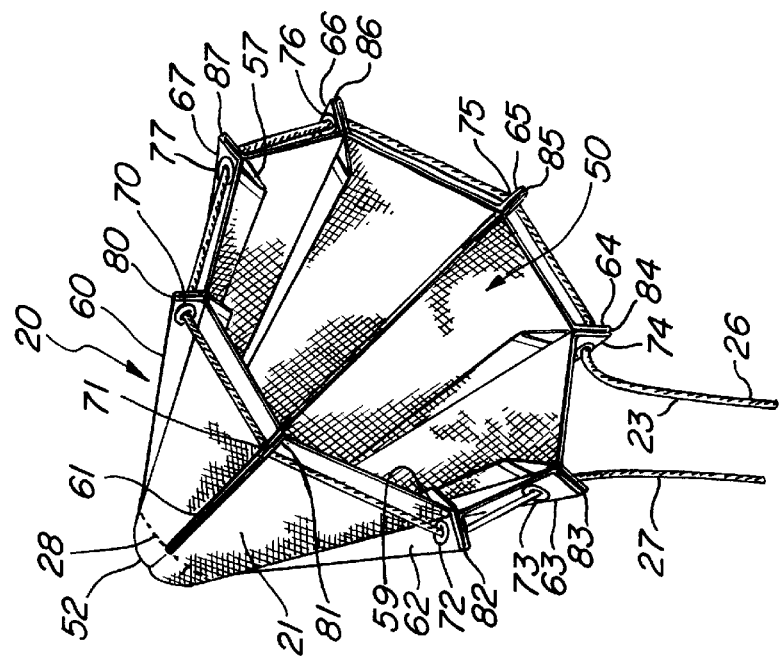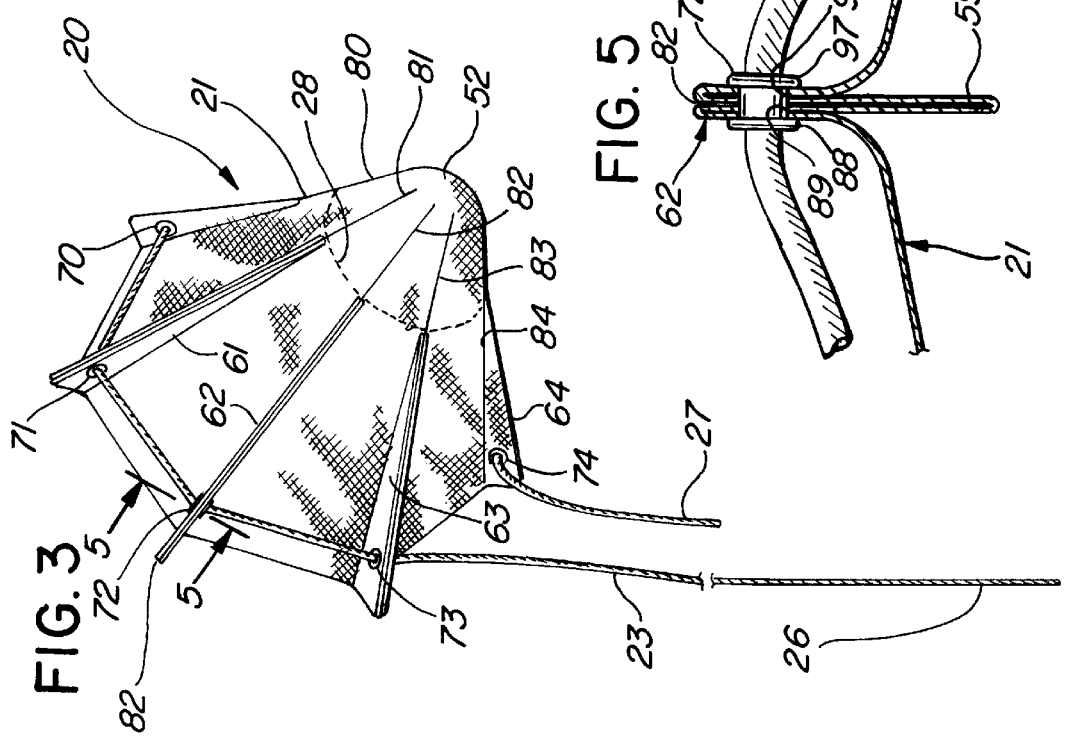

END RESTRAINT FOR SECURING PLURAL ELONGATED ITEMS

SPECIFICATION

1. Field of the Invention

This invention relates generally to the transportation of elongated items upon a truck rack or the like and particularly to the apparatus for securing pluralities of elongated items thereto.

2. Background of the Invention

A variety of elongated items are often used in various activities of construction and repair employed for structures such as commercial buildings, dwellings, recreational facilities and the like. Such elongated items vary substantially and include, for example, both metal and plastic pipe, electrical conduit, wooden boards, aluminum structural elements, and reinforcing bar often referred to as "rebar". Other elongated items are used in various specialty practices in construction and repair. While such elongated items are usually delivered to construction sites in large quantity such as a truckload or portion of a truckload, the need often arises to transport relatively small quantities of such elongated items by practitioners of the construction and repair arts.

The most common mode of transport for such small quantities of elongated construction and repair items utilizes a rigid rack secured to and extending upwardly from the bed portion of a pick-up or other small truck. Such racks are usually made of steel or other suitable strength material and include an upper set of transversely extending struts which provide rigidity for the truck rack and form a "bed" for supporting elongated items such as pipes, electrical conduit or the like. The most common practice exercised in utilizing such truck racks for transport of elongated items involves tying the elongated items into bundles using rope or straps and placing the tied bundles upon the upper struts of the truck rack in a front to back alignment. The bundles are then secured to the truck rack at convenient points with the objective of securely maintaining the bundled elongated items upon the truck rack. In many instances, the elongated items such as pipes or electrical conduit are of sufficient length to extend beyond the front and rear portions of the truck and truck rack.

This method of transporting elongated materials in small quantities is efficient and well suited to the commercial needs of practitioners of the construction and repair arts such as plumbers, electricians and carpenters. However, this method of transport while convenient is subject to significant safety problems and concerns. Perhaps the most serious safety concern in the transport of such elongated materials arises out of the tendency for the center items within a bundle to slide in response to forces caused by acceleration and deceleration of the truck during the transportation process. In many instances if this sliding of center items from a bundle is not noticed and corrected by the truck driver, a potentially hazardous situation develops in which one or more center items slide outwardly from a bundle and fall upon the road. The loss of one or more items from a given bundle quickly precipitates an even more hazardous circumstance as the tension of the bundle tie is released and the bundle collapses allowing the entire bundle to slip from the truck rack onto the roadway. Practitioners in the art attempt to avoid such disastrous events by tying each bundle as tightly as possible with the objective of creating substantial frictional forces between the elements of each bundle. However, tightly tying bundles of elongated materials often fails to secure all elements within a given bundle.

An additional safety concern or limitation arises in the transportation of elongated items which extend beyond the front or rear of the transporting truck in that other drivers often fail to observe the extending items. As a result of the potential hazard created by such extending items, various local laws require that some form of highly observable warning flag be secured to the end portions of extending items during transport. While such flags substantially improve the visibility of the extending items, they are often difficult to secure and are often subject to separation in response to wind and other forces as the vehicle moves along.

In related arts, practitioners have provided various devices for protecting the end portion and internal integrity of elongated items such as pipes or conduit. For example, U.S. Pat. No. 2,371,913 issued to Phillips, et al. sets forth a TUBE CLOSURE formed of a planar material having an adhesive side and an outer side cut to provide a plurality of wrapping flaps when secured to the end portion of a pipe or conduit to provide closure of the pipe or conduit interior.

U.S. Pat. No. 2,942,625 issued to Costanzo sets forth PIPE END PROTECTORS for use in protecting the threaded end of a pipe or similar article. The pipe end protector utilizes a substantially conical member formed of a flexible material and having a drawstring encircling the base of the conical protector. The conical protector receives the pipe end portion and the drawstring is drawn and tied to collapse the protector upon the pipe end exterior. The pointed end of the conical member is then pushed into the pipe interior.

U.S. Pat. No. 2,213,430 issued to Irwin, et al. sets forth a THREAD PROTECTOR for use in protecting the threaded end of a pipe or the like. The protector utilizes a closed end element having a plurality of pipe engaging elements which secure the closed end element upon the pipe end.

U.S. Pat. No. 3,587,654 issued to Yocum sets forth QUICK REMOVABLE SEAL CAPS FOR FITTINGS AND THE LIKE having a closed end cap receivable upon the fitting or the like which supports a string, wire, cord, or other flexible member placed between the seal cap and the fitting to facilitate removal and/or cutting of the seal cap.

U.S. Pat. No. 2,034,423 issued to Shrum sets forth a THREAD PROTECTOR for use in protecting a threaded pipe end or the like. The thread protector provides a closed end cap defining a plurality of engaging ridges on the interior thereof which cooperate with the pipe threads in securing the closed end cap.

U.S. Pat. No. 1,934,681 issued to Damsel sets forth a PIPE END PROTECTOR having a flexible closed end or toroidal shaped cap receivable upon the pipe end.

U.S. Pat. No. 2,028,576 issued to VanDyke sets forth a PIPE SECTION PROTECTION having a closed end member snap-fitted upon a pipe end.

U.S. Pat. No. 3,713,463 issued to Bywater sets forth a CLOSURE MEMBER FOR PIPES AND THE LIKE providing a closed end cap formed of a resilient material receivable upon a pipe end. The closure member further includes an encircling clamp which is received upon the outer surface of the resilient cap and which is constricted to secure the cap upon the pipe end.

While the prior art devices described have provided some improvement in the art, there remains nonetheless a continuing need for a safe and reliable apparatus for securing a plurality of elongated items upon a truck rack or the like during transport.

SUMMARY OF THE INVENTION

Accordingly, it is a general object of the present invention to provide an improved apparatus for securing a plurality of elongated items upon a truck rack during transportation. It is a more particular object of the present invention to provide an improved apparatus for securing a plurality of elongated items upon a truck rack which securely resists the forces applied to such items during transportation.

In accordance with the present invention, there is provided an end restraint for securing the ends of a plurality of elongated items for transport upon a truck rack, the end restraint comprising: a flexible envelope defining an open end, a closed end and an interior cavity; a plurality of eyelets secured about the open end of the flexible envelope; and a drawstring passing through the eyelets and forming at least one extending end, whereby the flexible envelope may be placed upon the end portion of a plurality of elongated items and the drawstring may be drawn to collapse the envelope thereupon and the at least one end may be tied to a truck rack.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a side elevation view of the present invention end restraint utilized upon a conventional pick-up truck and rack;

FIG. 2 sets forth a partial section view of an end restraint constructed in accordance with the present invention received upon a bundle of elongated items;

FIG. 3 sets forth a front perspective view of an end restraint constructed in accordance with the present invention;

FIG. 4 sets forth a rear perspective view of an end restraint constructed in accordance with the present invention; and FIG. 5 sets forth a partial section view of the drawstring attachment portion of the present invention end restraint.

DESCRIPTION OF THE PREFERRED EMBODIMENT

FIG. 1 sets forth a side elevation view of a conventional pick-up truck generally referenced by numeral 10 having a conventional truck rack generally referenced by numeral 13 secured thereto by vertical supports 14, 15, 16. In accordance with conventional fabrication, truck 10 includes a bed 11 supporting truck rack 13. In further accordance with conventional fabrication techniques, truck 10 includes a cab 12 providing for a driver and one or more passengers. Cab 12 is positioned forwardly of truck bed 11. Truck rack 13 is fabricated to provided a pair of side rails such as side rail 18 extending front to back above truck bed 11 and extending above cab 12. In further accordance with conventional fabrication techniques, truck rack 13 forms a bed 17 on the upper portion thereof which, as described above, may be formed by a plurality of transversely extending support members of truck rack 13. Of importance with respect to the present invention is the ability of truck bed 17 to support a plurality of elongated items such as pipes 40 in a front to back aligned relationship with respect to truck rack 13 and truck 10. For purposes of illustration, FIG. 1 shows a plurality of pipes 40 secured in a bundle by a plurality of tying bands 45, 46 and 47. While not shown in FIG. 1, it will be understood that in accordance with conventional fabrication techniques, bands 45, 46 and 47 are tightly drawn about pipe bundle 40 and tied to maintain secure bundling of pipes 40. Further, bands 45, 46 and 47 are customarily secured to a convenient portion of truck rack 13 using conventional attachment such as tied knots or the like (not shown).

The combination of truck 10, truck rack 13 and tied pipe bundle 40 having bands 45, 46 and 47 as thus far described are provided in accordance with conventional fabrication techniques. In accordance with the present invention, a pair of end restraints 20 and 30 are secured to the forward and rearward ends of pipe bundle 40. End restraints 20 and 30 are of identical fabrication and may be interchangeably used on the front or back of pipe bundle 40 in accordance with the present invention. Thus, end restraint 20 includes a fabric envelope 21 having a generally conical shape described below in greater detail forming a closed end 52 and, as is better seen in FIG. 2, an interior pocket 50. End restraint 20 further includes a plurality of eyelets such as eyelet 70 receiving a drawstring 23 in the manner better seen in FIGS. 3 and 4.

In accordance with the present invention, envelope 21 is received upon the forward end of pipe bundle 40 such that end 52 is brought into contact with the ends of the pipes within pipe bundle 40. Thereafter, drawstring 23 is tightly drawn to fold and collapse envelope 21 against pipe bundle 40 in the manner shown in FIG. 2. Thereafter, drawstring 23 is tied to secure the folding of envelope 21 forming a conventional tied knot 25. Drawstring 23 is then further tied to a convenient portion of truck rack 13 forming a tied knot 24. Once end restraint 20 is secured to the end of pipe bundle 40 in the manner described, each pipe within pipe bundle 40 is maintained in the bundled arrangement in a manner resisting movement of individual pipes within pipe bundle 40 as they abut closed end 52. Thus, with end restraint 20 secured to the forward end of pipe bundle 40 as shown in FIG. 1, movement of individual pipes within pipe bundle 40 in a forward direction in response to the braking action of truck 10 is prevented.

End restraint 30 is identical in fabrication to end restraint 20 and thus includes a flexible envelope 31 having a closed end 32 which is received upon the rear end of pipe bundle 40. In further correspondence to end restraint 20, end restraint 30 includes a drawstring 33 and a plurality of eyelets (not seen) which facilitate collapsing envelope 31 upon pipe bundle 40 and securing end restraint 30 to a convenient portion of truck rack 13 using tied knot 34. With end restraint 30 positioned on the rear end of pipe bundle 40, movement of individual pipes within pipe bundle 40 in response to acceleration of truck 10 is prevented as each pipe within bundle 40 is restrained by closed end 32 of envelope 31.

It will be apparent to those skilled in the art that the present invention end restraint may be utilized on either the forward or rear end of pipe bundle 40 as desired. It will be further apparent to those skilled in the art that a single end restraint may be utilized on either end without the necessity of utilizing a corresponding restraint on the opposite end of the pipe bundle. In the preferred fabrication of the present invention, the flexible envelope such as envelope 21 of end restraint 20 or envelope 31 of end restraint 30 is fabricated of a highly visible fabric having a bright red or bright orange color. In this manner, the present invention end restraint serves a dual function of securing the bundle of elongated items and providing a highly visible "flag" for extending end portions of the elongated items upon the truck rack.

FIG. 2 sets forth a partial section view of end restraint 20 secured to the end portion of pipe bundle 40. It should be recalled that end restraint 30 is identical in fabrication to end restraint 20. Accordingly, the descriptions and illustrations of end restraint 20 set forth in FIGS. 2 through 5 below should be understood to apply equally well and be equally descriptive of end restraint 30. As described above, end restraint 20 includes a flexible fabric envelope 21 supporting a plurality of eyelets such as eyelet 70. The arrangement of eyelets within envelope 21 are shown below in FIGS. 3 and 4 in greater detail. Suffice it to note here that a plurality of eyelets supported within envelope 21 receive a drawstring 23 to facilitate drawing and collapsing envelope 21 upon pipe bundle 40. Envelope 21 is preferably formed of a high visibility flexible fabric material having sufficient strength to resist the weight and inertial forces of pipe bundle 40. Thus, in its preferred form, envelope 21 is fabricated of a high visibility woven fabric synthetic material having a bright red or orange color. Envelope 21 defines a closed end 52 which receives end portions 41 of the plurality of pipes forming pipe bundle 40. As end restraint 20 is received upon pipe bundle 40 and drawstring 23 is drawn tightly collapsing envelope 21 against the pipe bundle forming folds 51, an interior pocket 50 having a closed end and an open end is formed upon the end portions of pipe bundle 40. Within interior pocket 50, end restraint 20 further includes an end layer 53 conforming to closed end 52 and extending partially along the interior surface of envelope 21. End layer 53 is secured to closed end 52 and envelope 21 using conventional fabric sewing forming a stitch line 28 (seen in FIGS. 3 and 4). End layer 53 provides additional strength for closed end 52 and further strengthens envelope 21 against the abrasive character of end portions 41 of pipe bundle 40. In its preferred form, surface 54 of end layer 53 may receive a grip coating layer 55 formed of a high friction material such as flexible rubber or plastic or their equivalent. Grip coating 55 may extend over all or part of surface 54 of end layer 53. Alternatively, grip coating 55 may also be formed upon the entire interior surface of envelope 21 as desired.

Pipe bundle 40 includes a plurality of pipes banded to form a bundle using a plurality of tying bands such as band 45. When so bundled, pipe bundle 40 includes a plurality of pipes disposed at the outer portion of the pipe bundle such as outer pipes 43 and 44 as well as pipes disposed within the bundle interior such as interior pipe 42. In accordance with the above-described safety problem created in transporting bundles of elongated items such as pipes or the like, the position of interior pipes such as interior pipe 42 within bundle 40 often shifts with respect to outer pipes such as outer pipes 43 and 44. Thus, for example, at the forward end of pipe bundle 40, outer pipes such as outer pipes 43 and 44 are in direct contact with tying band 45 as well as bands 46 and 47 (seen in FIG. 1). Accordingly, such outer pipes are generally secure and may be well maintained against various forces acting upon pipe bundle 40. Conversely, however, pipes within the interior of pipe bundle 40 such as interior pipe 42 are not in contact with band 45 and thus are secured solely by frictional contact with surrounding pipes within the pipe bundle. As a result, in response to forces imparted to the pipes within pipe bundle 40 caused by the stopping action of truck 10 (seen in FIG. 1), interior pipes such as interior pipe 42 tend to shift forwardly in the direction indicated by arrow 48. But for the holding action of end restraint 20, this force would cause interior pipe 42 to shift forwardly in the manner indicated by dashed-line representation of pipe 42. With repeated stopping action, interior pipe 42 would progressively move with respect to the remainder of pipes within pipe bundle 40 in the direction indicated by arrow 48 presenting the dangerous safety hazard described above.

It will be apparent to those skilled in the art that a corresponding reverse action is applicable to the rear end of pipe bundle 40 resulting in shifting of interior pipes within the pipe bundle as the host truck accelerates. The present invention end restraint, however, secures the end portion of pipe bundle 40 and prevents this potentially dangerous situation from occurring.

FIG. 3 sets forth a perspective view of end restraint 20 in the open position. End restraint 20 includes an envelope 21 formed of a flexible high visibility fabric having a closed end 52. Envelope 21 is formed into a generally conical shape defining a plurality of rib portions 60 through 67 (better seen in FIG. 4). Ribs 60 through 67 are formed in the manner shown in greater detail in FIG. 5. However, suffice it to note here that a plurality of sewn seams 80 through 87 (seen in FIG. 4) are stitched into envelope 21 such that ribs 60 through 67 are formed as seen in FIG. 5. Ribs 60 through 67 essentially provide "tucks" formed in envelope 21 through which a plurality of eyelets 70 through 77 (seen in FIG. 4) are received. Eyelets 70 through 77 secure ribs 60 through 67 forming the shape of end restraint 20 shown in FIGS. 3 and 4. As set forth above in FIG. 2, closed end 52 of envelope 21 further supports an end layer 53 reinforcing closed end 52. Returning to FIG. 3, a stitch line 28 encircles closed end 52 of envelope 21 and secures end layer 53 in place overlying closed end 52 in the manner shown in FIG. 2. A drawstring 23 is passed through eyelets 70 through 77 and forms a long end 26 and a short end 27. With temporary return to FIG. 1, it should be noted that drawstring 23 is used both to close end restraint 20 upon pipe bundle 40 at a knot 25 and to secure restraint 20 to truck rack 13.

Returning to FIG. 3, the positioning of drawstring 23 within eyelets 70 through 77 to provide a short end 27 and a long end 26 facilitates tying a knot using short end 27 to provide closure of end restraint upon the enclosed pipe bundle or the like leaving long end 26 for securing drawstring 23 and end restraint 20 to the truck rack. It will be apparent to those skilled in the art, however, that in response to different tying situations, drawstring 23 may be disposed within eyelets 70 through 77 in various proportions and positions.

FIG. 4 sets forth a rear perspective view of end restraint 20 in the open position shown in FIG. 3. As described above, end restraint 20 includes an envelope 21 having a closed end 52 and defining an interior pocket 50. As is also described above, a plurality of sewn seams 80 through 87 are sewn into envelope 21 to provide a generally conical shape to envelope 21. Further, a plurality of eyelets 70 through 77 are fastened inwardly of seams 80 through 87 respectively at the base portion of the conical shape thus formed. The combination of seams 80 through 87 and eyelets 70 through 77 form envelope 21 into the shape shown in FIGS. 3 and 4 in which a plurality of tapered ribs 60 through 67 are generally formed in an equally spaced arrangement about envelope 21. As is better seen in FIG. 5, each of ribs 60 through 67 is formed of a plurality of overlapping folds and tucks extending inwardly into interior pocket 50. Each end portion of the interior portion of ribs 60 through 67 is folded over and stitched to form an end fold such as end folds 57 formed on rib 67 and end fold 59 formed on rib 62. Thus, each of ribs 60 through 67 is formed in a substantially identical fashion and each includes an end fold as shown in FIG. 4. A drawstring 23 includes ends 26 and 27 and is passed through each of eyelets 70 through 77.

FIG. 5 sets forth a partial section view of end restraint 20 taken along section lines 5—5 in FIG. 3. As described above in FIGS. 3 and 4, envelope 21 is formed into a generally conical structure by a plurality of sewing seams 80 through 87 which together with a plurality of eyelets 70 through 77 form envelope 21 into the generally conical multiply ribbed shape shown in FIGS. 3 and 4. Accordingly, it will be understood that the structure set forth in FIG. 5 for rib 62 is equally applicable and descriptive of the remaining ribs formed in envelope 21 shown in FIGS. 3 and 4. Thus, envelope 21 is formed into a rib 62 by a plurality of fabric layers formed in a plurality of overlying pleats and sewn together along a seam 82. Seam 82 thus forms the outer edge of rib 62. The interior layers of rib 62 extend inwardly of envelope 21 forming end fold 59. A plurality of apertures 88, 89, 96 and 97 are formed within the four overlying layers of rib 62 in general alignment to facilitate the attachment of eyelet 72 in the manner shown. With eyelet 72 in place, the overlapping four layers which form the exterior portion of rib 62 are mutually secured to complete the fabrication of rib 62. With a similar structure configured into the remaining ribs of envelope 21 in the manner shown in FIGS. 3 and 4, envelope 21 is completed. Drawstring 23 is passed through the interior passage of eyelet 72. It will be apparent to those skilled in the art that the plural layers of fabric material forming rib 62 secured by eyelet 72 substantially strengthens the attachment of eyelet 72 and provides increased strength for tying envelope 21 using drawstring 23.

It will be apparent to those skilled in the art that while the illustration set forth above depicts elongated items which comprise conventional pipe, other elongated material such as wooden boards, electrical conduit, reinforcing bar, and specialized structural elements may be similarly bundled during transport and thus may similarly benefit from the present invention end restraint.

What has been shown is an end restraint for use in securing the end portions of a bundle or other plurality of elongated items such as pipe, conduit, reinforcing bar, wooden boards or the like during transport upon a conventional truck rack or similar device. The end restraint shown utilizes a flexible fabric envelope formed in a generally conical shape and having a drawstring arrangement for conforming the envelope to the end portion of the elongated material bundle. The end restraint provided maintains the bundled position of elongated items during transport and serves the dual function of providing a brightly colored high visibility end "flag" for the bundled items. The high visibility character of the present invention end restraint serves the warning function of a conventional warning flag in the event the elongated items extend beyond the front or back of the transporting vehicle.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An end restraint for securing the ends of a plurality of elongated items for transport upon a truck rack, said end restraint comprising:

a flexible envelope defining an open end, a closed end, a plurality of ribs and an interior cavity;

a plurality of eyelets secured within said ribs about said open end of said flexible envelope; and a drawstring passing through said eyelets and forming at least one extending end, whereby said flexible envelope may be placed upon the end portion of a plurality of elongated items and said drawstring may be drawn to collapse said envelope thereupon and said at least one end may be tied to a truck rack.

2. An end restraint as set forth in claim 1 further including an end layer of fabric secured to said flexible envelope within said interior cavity overlying said closed end.

3. An end restraint as set forth in claim 2 further including a layer of high-friction material formed upon said end layer of fabric.

4. An end restraint as set forth in claim 1 wherein said flexible envelope is formed of a brightly colored high-visibility fabric.

5. An end restraint as set forth in claim 4 further including an end layer of fabric secured to said flexible envelope within said interior cavity overlying said closed end.

6. An end restraint as set forth in claim 5 further including a layer of high-friction material formed upon said end layer of fabric.

7. An end restraint for holding the end portions of a bundle of elongated items, said end restraint comprising:

a flexible envelope defining a closed end, an interior cavity for receiving the end portion of a bundle of elongated items and an end layer of fabric secured to said flexible envelope within said interior cavity overlying said closed end, said layer of fabric including a layer of high-friction material formed upon said end layer of fabric, a drawstring for collapsing said flexible envelope upon the end portions of a bundle of elongated items, said drawstring defining at least one end for tying said envelope to an object.

8. An end restraint as set forth in claim 7 wherein said flexible envelope defines a generally conical shape when said drawstring is loose.

9. An end restraint for securing the ends of a plurality of elongated items for transport upon a truck rack, said end restraint comprising:

a flexible envelope formed of a brightly colored high-visibility fabric and defining an open end, a closed end, an interior cavity and an end layer of fabric secured to said flexible envelope within said interior cavity overlying said closed end including a layer of high-friction material formed upon said end layer of fabric;

a plurality of eyelets secured about said open end of said flexible envelope; and a drawstring passing through said eyelets and forming at least one extending end, said envelope defining a generally conical shape when said drawstring is loose, whereby said flexible envelope may be placed upon the end portion of a plurality of elongated items and said drawstring may be drawn to collapse said envelope thereupon and said at least one end may be tied to a truck rack.

10. An end restraint as set forth in claim 9 wherein said flexible envelope defines a plurality of ribs and wherein said eyelets are secured within said ribs.

11. An end restraint for securing the ends of a plurality of elongated items for transport upon a truck rack, said end restraint comprising:

a flexible envelope defining an open end, a closed end, an interior cavity and an end layer of fabric secured to said flexible envelope within said interior cavity overlying said closed end and a layer of high-friction material formed upon said end layer of fabric.

a plurality of eyelets secured about said open end of said flexible envelope; and a drawstring passing through said eyelets and forming at least one extending end, whereby said flexible envelope may be placed upon the end portion of a plurality of elongated items and said drawstring may be drawn to collapse said envelope thereupon and said at least one end may be tied to a truck rack.

* * * * *